United States Patent [19]

Kakizaki

[11] Patent Number: 5,408,245
[45] Date of Patent: Apr. 18, 1995

[54] PLASMA ADDRESSING ELECTRO-OPTICAL DEVICE

[75] Inventor: Takehiro Kakizaki, Kanagawa, Japan

[73] Assignee: Sony Corporation, Tokyo, Japan

[21] Appl. No.: 212,382

[22] Filed: Mar. 14, 1994

Related U.S. Application Data

[63] Continuation of Ser. No. 942,773, Sep. 10, 1992, abandoned.

[30] Foreign Application Priority Data

Sep. 11, 1991 [JP] Japan .................................. 3-258700

[51] Int. Cl.⁶ .............................................. G09G 3/22
[52] U.S. Cl. ........................................ 345/60; 345/67; 345/87
[58] Field of Search .................. 345/60, 67, 71, 72, 345/87; 315/169.1, 169.4

[56] References Cited

U.S. PATENT DOCUMENTS

| | | | |
|---|---|---|---|
| 4,562,434 | 12/1985 | Amano | 340/775 |
| 4,737,687 | 4/1988 | Shinoda et al. | 315/169.4 |
| 4,896,149 | 1/1990 | Buzak | 340/794 |
| 5,077,553 | 12/1991 | Buzak | 340/771 |
| 5,107,182 | 4/1992 | Sano et al. | 340/775 |

*Primary Examiner*—Ulysses Weldon
*Assistant Examiner*—Xiao M. Wu
*Attorney, Agent, or Firm*—Hill, Steadman & Simpson

[57] ABSTRACT

A plurality of signal electrodes D arranged in parallel to each other are formed on a major surface of a first substrate 4. A second substrate 7 is disposed face to face to the first substrate. A plurality of plasma electrodes 9 arranged in parallel to each other and intersecting the signal electrodes D are formed on an inner surface of the second substrate 7. The plasma electrodes 9 are covered with an insulating film 10 for improvement of corrosion resistance. Instead of the insulating film, it is also preferable to form the plasma electrodes 9 themselves by a chemically inactive metallic film. An electro-optical material (e.g.liquid crystal) layer 6 is sandwiched between the first substrate 4 and the second substrate 7. A plasma chamber 11 is formed between the liquid crystal layer 6 and the second substrate 7, and filled with an ionizable gas. The gas is selectively ionized by the discharge between the two adjacent plasma electrodes 9. The liquid crystal layer 6 is driven with the discharge regions 12 at which the ionized gas is localized as the scanning unit. Further, an aperture communicating with the open air is formed in the plasma chamber 11 for improvement of pressure resistance. Since the corrosion resistance of the plasma electrodes can be increased, the plasma cell structure can be simplified and further the pressure resistance can be improved.

6 Claims, 6 Drawing Sheets

PLASMA ADDRESSING ELECTRO-OPTICAL DEVICE

This is a continuation, of application Ser. No. 07/942,773, filed Sep. 10, 1992, now abandoned.

BACKGROUND OF THE INVENTION

1. Field of the Invention

The present invention relates to a plasma addressing electro-optical device (e.g. liquid crystal display device) of double layer structure composed of an electro-optical cell (e.g. liquid crystal cell ) =and a plasma cell, and more specifically to the structure of the plasma cell for implementing addressing on the basis of a selective plasma discharge.

2. Description of the Related Art

As means for realizing matrix-type liquid crystal display devices of higher resolution and higher contrast, an active matrix addressing technique has been conventionally adopted, by which switching elements such as thin film transistors are provided for display pixels (picture elements), respectively and the respective switching elements are turned on or off in the order of lines. In this prior art technique, however, since a great number of the semiconductor switching elements such as thin film transistors must be formed on a substrates, there exists a problem in that the production yield is deteriorated, in particular when the area or the size of the display device is large.

To overcome the above-mentioned problem, Buzak el al. have proposed a method of adopting plasma switches based upon selective plasma discharge, in place of the switching elements such as thin film transistors, as disclosed in Japanese Published Unexamined (Kokai) Patent Application No. 1-217396, which corresponds to U.S. Pat. Nos. 4,896,149 and 5,077,553, and which are incorporated herein by reference.

Figure 10:
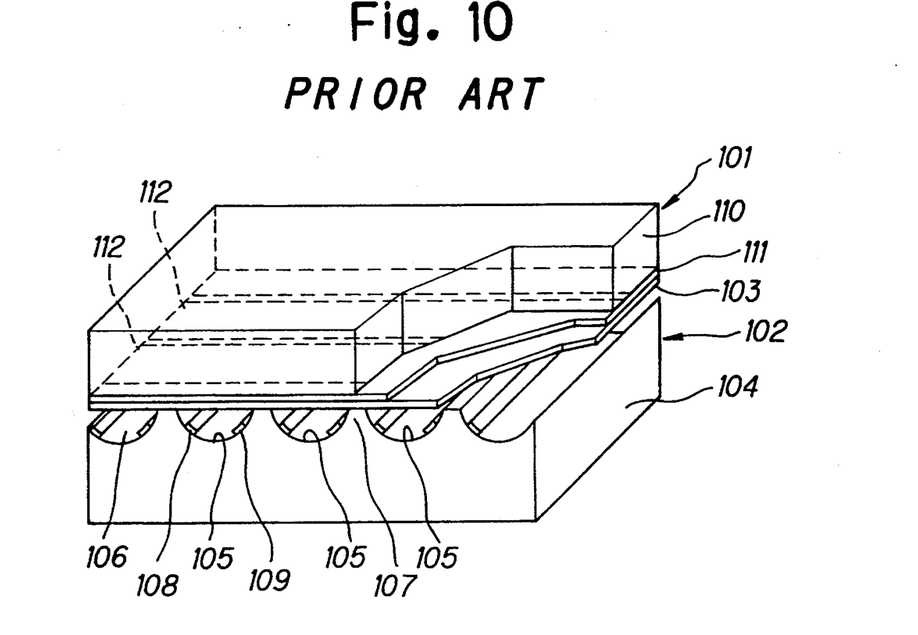
FIG. 10 is a perspective, partially broken view showing an example of prior art plasma addressing electro-optical devices.

The configuration of this prior art plasma-addressing display device for driving the liquid crystal cells by use of the plasma switches will be described briefly hereinbelow with reference to the attached drawings. As shown in FIG. 10, the display device is of layer built structure such that a liquid crystal cell 101 is placed upon a plasma cell 102 via a common dielectric partition 103. The plasma cell 102 is formed by use of a glass substrate 104 including a plurality of parallel arranged channels 105 formed on the surface thereof. The respective channels 105 are closed by the partition 103 so as to form separated plasma chambers 106. The two adjacent plasma chambers 106 are mutually separated by convex portions 107 of the substrate 104, and the respective plasma chambers are filled with an ionizable gas respectively. In addition, a pair of electrodes 108 and 109 are formed on the bottom portions of the respective channels 105 so as to extend in the longitudinal direction thereof. A plurality of pairs of the electrodes function as the anode and cathode electrodes for ionizing the gas within the plasma chambers 106, respectively to generate discharge plasma.

On the other hand, the liquid crystal cell 101 is formed by use of an upper glass substrate 110. The space between the substrate 110 and the partition 103 is filled by a liquid crystal layer 111. On the inner surface of the substrate 110, a plurality of parallel arranged signal electrodes 112 formed by a transparent conductive film are provided in such a way as to intersect the plasma chambers 106. The intersections between the signal electrodes 112 and the plasma chambers 106 correspond to respective pixels arranged in a matrix fashion.

To drive the above-mentioned plasma addressing display device, localized discharge regions are produced by generating plasma discharge for the respective plasma chambers 106 in the order of lines. The discharge regions become the scanning unit. The respective pixels are driven by applying analog driving voltages to the signal electrodes 112 on the liquid crystal side 101 in synchronism with the line order scanning. In other words, the respective discharge regions function as sampling switches, and the analog driving voltages are sample-held at the sampled pixels.

In the above-mentioned display device, the addressing for the liquid crystal cell can be made by repeating the selective plasma discharge. The plasma discharge can be generated when a high tension voltage is applied between a pair of the discharge electrodes, that is, the anode and cathode electrodes. The discharge electrodes are formed by a metallic thin film ordinarily. Therefore, the electrodes are subjected to abrasion and corrosion due to repeated discharge. In particular, electrodes corrosion is accelerated markedly by impurities such as moisture or oxygen, and therefore the electrode quality is deteriorated, resulting in a short life time of the plasma cell. In general, the above-mentioned impurities enter the cell from the outside or are produced inside the cell.

To overcome the above-mentioned problem, conventionally, the plasma cell is sealed by frit so as to obtain air-tight plasma chambers formed of inorganic material, and additionally baked for outgassing or gas evolution. Therefore, in the prior art display device, since the plasma cells must be treated at high temperature during the manufacturing process, there exist problems in that the production cost is relatively high and further it is difficult to increase the size of the plasma cells.

On the other hand, the liquid crystal cells are usually treated at low temperature during the manufacturing process thereof. Therefore, there arise various problems in that the manufacturing process of the display devices is markedly restricted, because the liquid crystal cells are treated after the plasma cells have been assembled, as an inevitable consequence.

Figure 11:
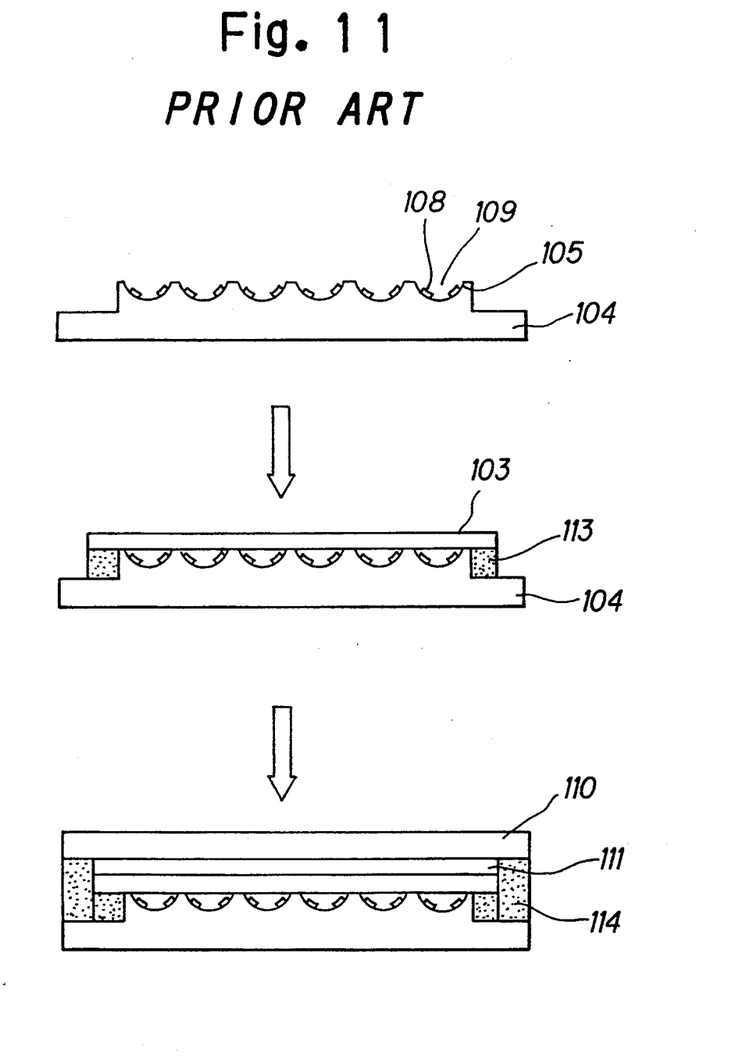
FIG. 11 is an illustration for assistance in explaining the manufacturing process of the prior art plasma addressing electro-optical device.

These problems will be described in more detail with reference to FIG. 11 which shows the prior art manufacturing process of the display device. First, the channels 105 are formed on the surface of the substrate 104 by etching technique. Secondly, the plasma electrodes such as the anode and cathode electrodes 108 and 109 are formed on the bottoms of the channels 105, respectively. Then, the dielectric partition 103 is bonded onto the substrate 104 by use of a frit sealing material 113. The partition 103 is formed of an inorganic material such as glass. The frit sealing material 113 serves to increase the air tightness performance of the plasma chambers and requires a high temperature treatment of about 400° C. Thereafter, the plasma cell is baked for outgassing to remove gas from the plasma chambers also at a high temperature. Lastly, the liquid crystal cell substrate 110 is bonded to the substrate 104 by use of a second organic sealing material 114 such as a high molecular bonding agent. The hardening temperature of the bonding agent is as low temperature as about 150° C., for instance, which is a low treatment temperature. Further, the liquid crystal layer 111 is filled in a gap formed between the partition 103 and the substrate 110. During this process, it is necessary to control the thickness of the liquid crystal layer 111 precisely on the order of several μm to regulate the above-mentioned gap dimension at a constant value. In this case, however, it is extremely difficult to assemble the liquid crystal cell with the plasma cell which has been treated at high temperature, so that the thickness of the liquid crystal layer has a constant gap distance, with the result that the production yield is low. In this case, it may be possible to assemble the liquid crystal cell before the plasma cell is assembled. However, since the treatment or process temperature of the plasma cell is higher than that of the liquid crystal cell, the above-mentioned method is impossible in practice. All the above-mentioned various problems result from the fact that the plasma cells must be hermetically sealed.

SUMMARY OF THE INVENTION

With these problems in mind, therefore, it is the first object of the present invention to provide a plasma addressing electro-optical device of a plasma electrode structure which can maintain a stable reliability for many hours, without being dependent upon the hermetic sealing structure.

Here, the pressure-proof characteristic is an important factor related to the hermetic seal. That is, the ionizable gas is sealed within the plasma cell at a constant pressure. Therefore, when this gas pressure is lower than the atmospheric pressure, there exists a problem in that the plasma cell is deformed under a high external pressure. To prevent the deformation as described above, some supporting stays may be required, thus resulting in a complicated cell structure and also more complicated manufacturing process. In contrast with this, when the gas is sealed at the atmospheric pressure, there exists another problem in that the plasma cell is exploded under a vacuum (negative) pressure such as when transported by aircraft, for instance.

Accordingly, it is the second object of the present invention to provide a plasma addressing electro-optical device of a plasma cell structure which is excellent in pressure-proof characteristics, without being subjected to the influence of external pressure.

To achieve the above mentioned objects, the plasma addressing electro-optical device according to the present invention is configured as follows: The display device comprises a first substrate and a second substrate disposed face to face with respect to each other. A plurality of first electrodes, that is, signal electrodes are formed substantially in parallel to each other on a major surface of the first substrate. A plurality of second electrodes, that is, plasma electrodes are formed substantially in parallel to each other and intersecting the signal electrodes on a major surface of the second substrate. Further, an insulating film is formed so as to cover the plasma electrodes. An electro-optical material layer such as liquid crystal layer is interposed between the first and second substrates. A plasma chamber is formed between the electro-optical material layer and the second substrate, in which an ionizable gas is filled.

In the cell structure as described above, the gas is selectively ionized due to discharge generated between the two adjacent plasma electrodes, and the electro-optical material layer is driven at the respective intersections between the signal electrodes and the discharge regions with the discharge regions in which the ionized gas is localized as the scanning unit.

Further, it is also possible to form the plasma electrodes by a chemically inactive metallic film, in place of the plasma electrodes covered with an insulating film.

In the other aspect of the present invention, an aperture communicating with the open air is provided and air is utilized as the ionizable gas, in addition to the above-mentioned plasma electrode structures such as to be covered with an insulating film or as to be formed by a chemically inactive metallic film.

In the plasma addressing device according to the present invention, since the plasma electrodes are protected by an insulating film or formed of a chemically inactive noble metal material, the plasma electrodes are provided with a strong resistance against corrosion caused by impurities such moisture or oxygen, as compared with the prior art device. Accordingly, it is possible to adopt the sealing structure depending upon organic material and low temperature treatment, instead of the prior art hermetic sealing structure which requires non-organic material and high temperature treatment. This results in the fact that large-sized plasma cells can be easily manufactured at such low treatment temperature as required for the liquid crystal cells. Therefore, it is possible to assemble the liquid crystal cells before the plasma cells are assembled, so that it is possible to control the thickness of the liquid crystal layer extremely uniform. Further, in the case where the plasma electrodes are covered with an insulating film, the AC plasma discharge driving method is adopted instead of the prior art DC plasma discharge driving method.

Namely, the device by the arrangement, the ionizable gas filled in the plasma chamber can be excited by an AC energy source.

Further, in the other aspect of the present invention, the plasma chamber is formed so as to communicate with the external pressure, without being sealed. Therefore, no pressure difference is produced between the inside and the outside of the cell under any pressure conditions, thus eliminating the problems related to the pressure-proof characteristics. In this case, since the ionizable gas is inevitably air, the discharge efficiency may be reduced. In the plasma addressing display device according to the present invention, however, since the plasma cells are used as the switches turned on or off for line order scanning, without being used as the light emitting sources, the deterioration of the discharge efficiency will not cause any trouble.

DETAILED DESCRIPTION OF THE PREFERRED EMBODIMENTS

Embodiments of the plasma addressing electro-optical device according to the present invention will be described hereinbelow with reference to the attached drawings.

Figure 1:
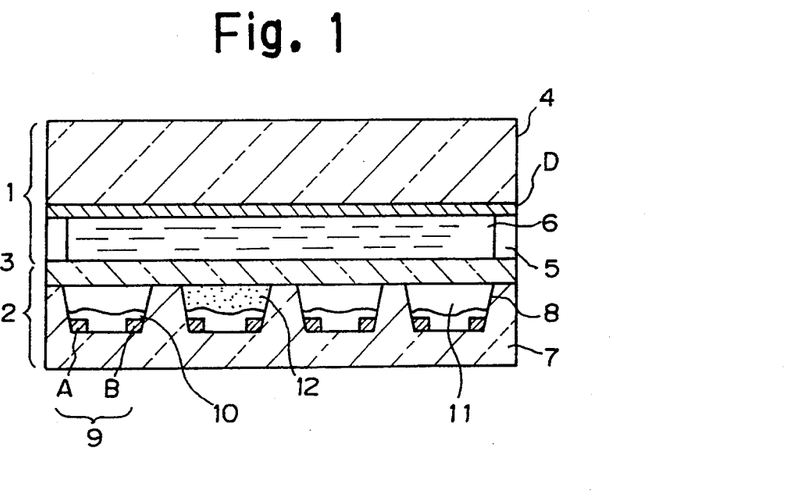
FIG. 1 is a cross-sectional view showing a first embodiment of the plasma addressing electro-optical device according to the present invention.

FIG. 1 shows a first embodiment of the plasma addressing liquid crystal display device according to the present invention. Here, without being limited to only the liquid crystal display device, the present invention is of course applicable widely to the ordinary plasma addressing electro-optical devices.

The device is of layer built structure, which comprises a liquid crystal cell 1, a plasma cell 2, and an dielectric partition 3 interposed between both the cells 1 and 2. The liquid crystal cell 1 is formed of a glass substrate 4. Of course, it is possible to replace the glass substrate 4 with a transparent plastic material. On the inner surface of the substrate 4, a plurality of signal electrodes D of transparent conductive material are formed being arranged in parallel to each other. The substrate 4 is bonded to the isolating barrier 3 so as to provide a predetermined gap therebetween by use of sealing material 5 of an organic or high molecular bonding agent. This gap is filled with a liquid crystal layer 6 of electro-optical material.

On the other hand, the plasma cell 2 is formed by a substrate 7. This substrate 7 can be formed of glass material. To reduce the material cost thereof, however, it is possible to form the substrate of an organic material such as high molecular or plastic material. On the surface of the substrate 7, a plurality of parallel arranged channels 8 are formed extending in the direction perpendicular to the signal electrodes D. The channels 8 can be formed together with the substrate 7 by use of a metallic mold, for instance. A pair of electrodes A and B are formed on the bottom portions of the channels 8, respectively. These electrodes are plasma electrodes 9, which can be obtained by depositing a metallic film by vacuum evaporation or sputtering and then by patterning the deposited film by etching. The surfaces of the plasma electrodes 9 are covered with an insulating film 10, respectively. This insulating film 10 is an dielectric film obtained by depositing silicon dioxide, for instance by sputtering or vacuum evaporation. The substrate 7 is bonded to the isolating barrier 3 with an organic bonding agent. As described above, the respective channels 8 constitute the respective separated, sealed plasma chambers 11. The respective plasma chambers 11 are filled with ionizable gas so as to form the respective discharge regions. In more detail, when a high voltage is applied between a pair of the plasma electrodes A and B, the gas is ionized to generate plasma discharge. The generated plasma discharge regions become a row scanning unit, and the signal electrodes D become a column driving unit. That is, pixels are determined in a matrix fashion at the intersections of both the units or between the plasma electrodes A, B and the signal electrodes D. The ionizable gas can be selected form the group of argon, neon, helium, a mixture thereof, and air. Further, in this embodiment, since a fluid liquid crystal layer is used as the electro-optical material layer, the isolating barrier 3 is needed. However, when a solid electro-optical material such as PLZT is used, it is possible to eliminate the isolating barrier 3.

In this embodiment, the plasma electrodes 9 are covered and protected with the insulating film 10. Therefore, the electrodes 9 are not corroded in case impurities such as moisture or oxygen exist within the plasma cell. In other words, the plasma cell 2 of the present invention can be assembled together with the liquid crystal cell 1 through low temperature treatment substantially the same as that required for the liquid crystal assembling process, by use of organic substrate material and organic bonding material, without need of any hermetic sealing structure. Therefore, it is also possible to first assemble the liquid crystal cell 1 and then to stack the plasma cell 2 upon the assembled liquid crystal cell 1 at the later manufacturing process. In addition, the high temperature baking process as required for the prior art device for outgassing or gas evolution is unnecessary.

Figure 2:
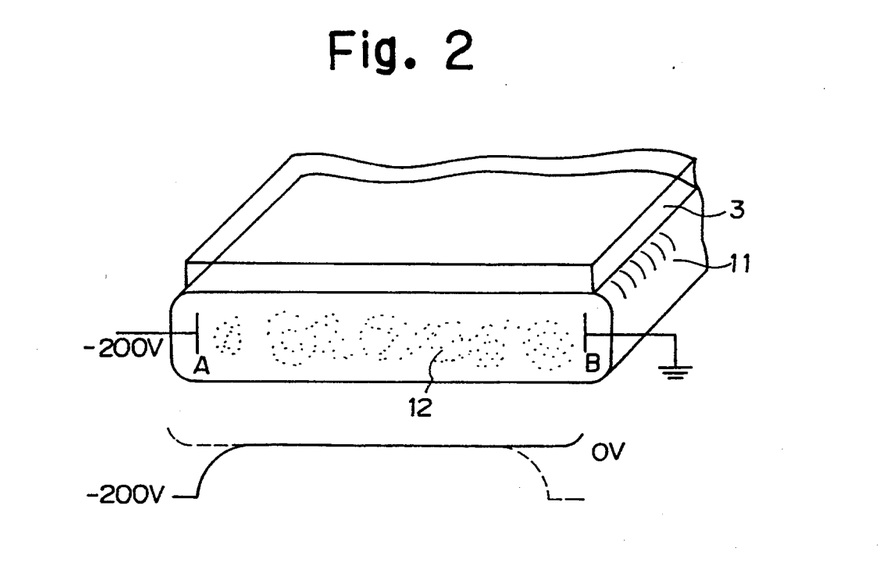
FIG. 2 is a perspective illustration showing a single plasma chamber 11 separated form the embodiment shown in FIG. 1.

FIG. 2 shows a single plasma chamber 11 taken out of the first embodiment shown in FIG. 1. As already explained, the plasma chamber 11 is filled with an ionizable gas, and plasma discharge occurs when a predetermined high tension is applied between a pair of the plasma electrodes A and B.

In more detail, one plasma electrode B is determined as an anode connected to the ground potential, and the other plasma electrode A is determined as a cathode to which —200 V is applied. Under theses conditions, the whole space of the discharge region is roughly at the anode potential. The plasma discharge occurs in practice through the insulating film 10. When the discharge region 12 is at the anode potential as a whole, the anode potential is given to the dielectric partition 3 for constituting one end of each pixel. On the other hand, when the plasma discharge has been completed, the plasma chamber 11 is at the stray potential. Therefore, the discharge region 12 can function as a so-called plasma switch. Further, when a pair of the electrodes A and B are reversed in polarity, the similar plasma discharge occurs, and the discharge region is held at the anode potential as a whole as shown by dashed lines in FIG. 2. In the embodiment shown in FIG. 1, the plasma electrodes 9 are covered with the insulating film 10. Therefore, when a pair of the plasma electrodes A and B are fixed to the anode and cathode, respectively (referred to as DC discharge), since the electric charge is accumulated at the insulating film 10, so that the discharge will stop. To overcome this problem, in this embodiment, the polarity of a pair of electrodes A and B is inverted field by field (referred to as AC discharge).

Figure 3:
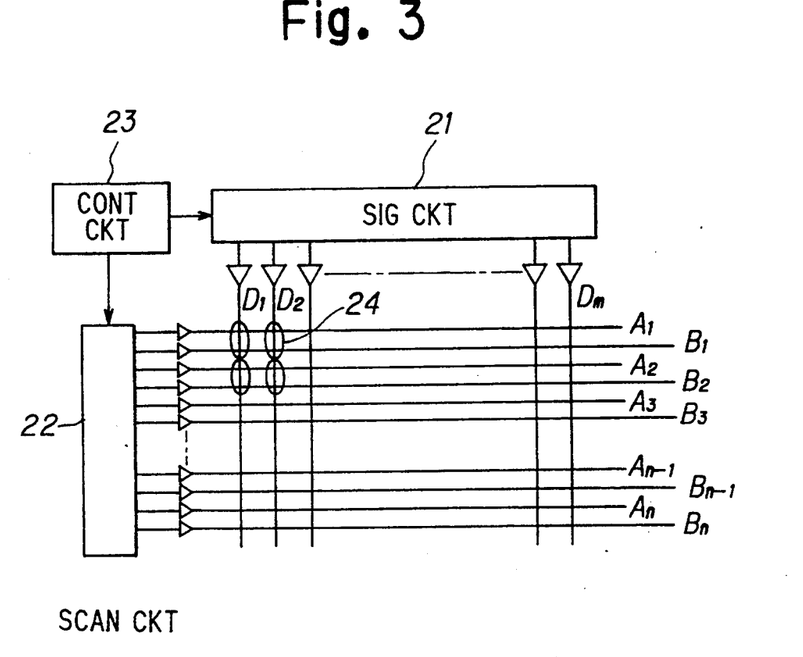
FIG. 3 is schematic block diagram showing an example of the driving circuit for driving the embodiment shown in FIG. 1.

FIG. 3 is a block diagram showing a driving circuit used for the plasma addressing liquid crystal display device. The driving circuit comprises a signal circuit 21, a scanning circuit 22, and a control circuit 23. The signal electrodes D1 to Dm are connected to the signal circuit 21 via a buffer, respectively. Further, the plasma electrodes A1 to An and B1 to Bn are connected alternately to the scanning circuit 22 via a buffer, respectively. The scanning circuit 22 selects a pair of the plasma electrodes from (A1, B1) to (An, Bn) for scanning in the order of lines, so as to form discharge regions which correspond to the row scanning unit. On the other hand, the signal circuit 21 applies analog driving voltages to the respective signal electrodes from D1 to Dm in synchronism with the line (row) order scanning. In other words, the signal electrodes D1 to Dm correspond to the column driving unit. Therefore, pixels 24 are determined at the intersections between the row scanning unit and the column driving unit.

Figure 4:
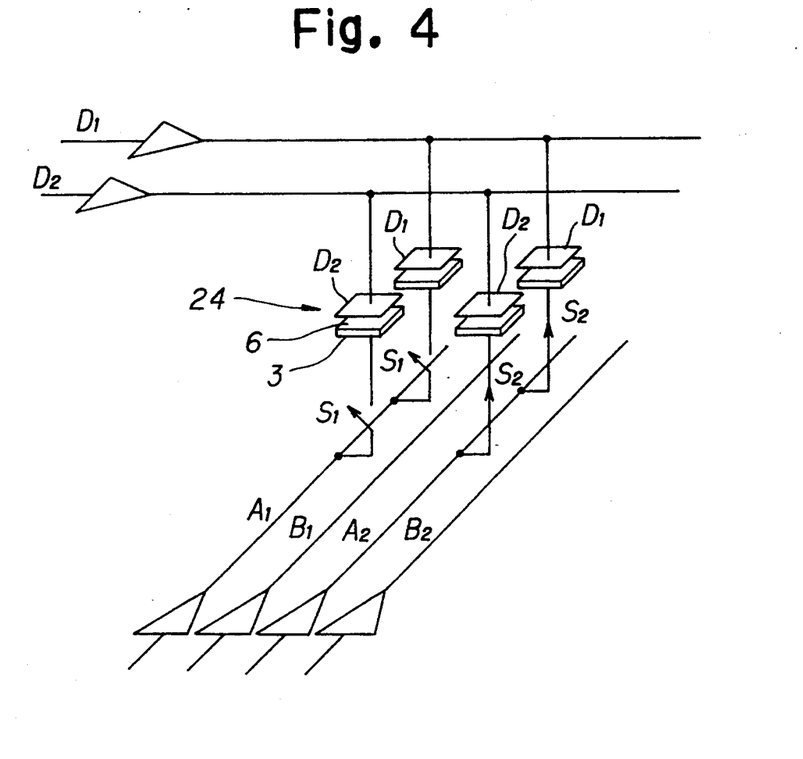
FIG. 4 is a perspective illustration for assistance in explaining the operation of the four pixels separated form the embodiment shown in FIG. 1.

FIG. 4 shows only four pixels 24 separated form those shown in FIG. 3. Each pixel 24 is composed of a sampling capacitor and a plasma sampling switch both connected in series with each other. The sampling capacitor is the liquid crystal layer 6 sandwiched between the signal electrode (D1, D2) and the isolating barrier 3. The plasma switches (S1, S2) are the discharge regions formed along a pair of the plasma electrodes (A1, B1) or (A2, B2), respectively. When the plasma switches (S1, S2) are turned on, analog driving voltages are applied to the corresponding sampling capacitors, so that the turning-on or -off operation of the respective pixels are controlled. Even after the plasma sampling switches are turned off, the analog driving voltages are held at the respective pixels (referred to as sampling hold function).

Figure 5:
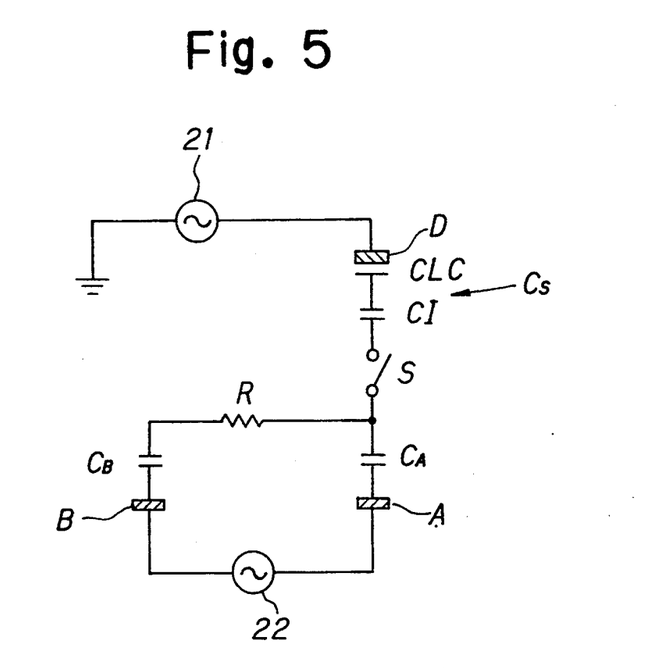
FIG. 5 is an equivalent circuit corresponding to each pixel.

FIG. 5 is an equivalent circuit of each pixel shown in FIG. 4. The sampling capacitance $C_S$ is composed of a capacitance component $C_{LC}$ of the liquid crystal layer and a capacitance component $C_I$ of the dielectric partition both connected in series with each other. The plasma sampling switch is turned on when a predetermined AC discharge voltage is applied to a pair of the plasma electrodes A and B from the scanning circuit 22. When the plasma sampling switch S is turned on, the sampling capacitor $C_S$ is charged by the signal circuit 21. The polarity of the discharge voltage is inverted field by field. The plasma discharge is effected through the insulating film which covers the electrodes. Therefore, the capacitance components $C_A$ and $C_B$ of the respective insulating films are connected to the respective plasma electrodes A and B. The electric charges of the capacitance components $C_A$ and $C_B$ are repeatedly charged and then discharged through a discharge current by inverting the polarity of the discharge voltage, without accumulating electric charges therein. In other words, the discharge is maintained intermittently by the AC discharge.

Figure 6:
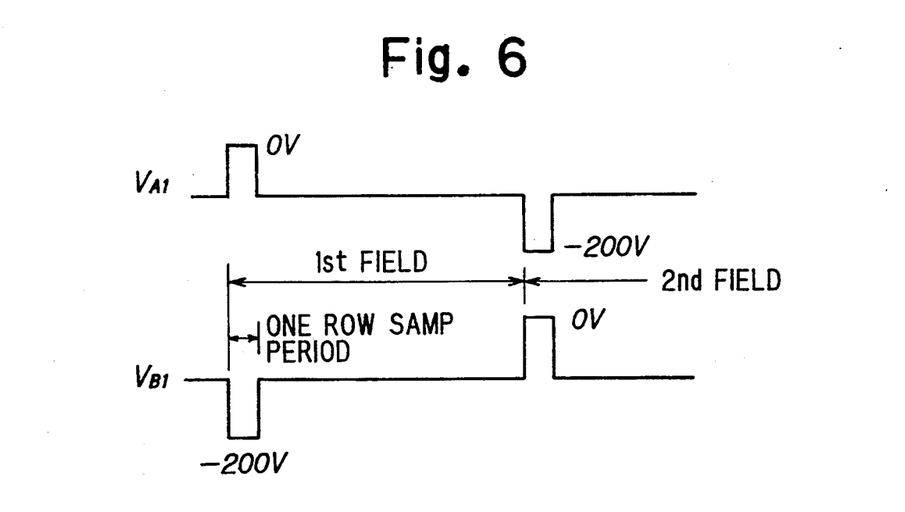
FIG. 6 is two waveform diagrams for assistance in explaining the operation of the driving circuit shown in FIG. 3.

FIG. 6 shows an example of the voltage waveforms of the AC discharge driving circuit. In the first field period during which the first line (row) order scanning is effected, and at the first one line (row) sampling period, a pulse voltage $V_{A1}$ of 0 V, for instance is applied to one plasma electrode A1, and another pulse voltage $V_{B1}$ of $-200$ V, for instance is applied to the other plasma electrode B1. That is, the plasma electrode A1 becomes the anode electrode and the plasma electrode B1 becomes the cathode electrode to generated plasma discharge. Since the whole discharge region is held at the anode potential, the plasma switch is turned on. Subsequently, in the second field period and at the first one line sampling period, pulse voltages of the reverse polarity are applied to the plasma electrodes. At this time, the plasma electrode A1 becomes the cathode electrode and the plasma electrode B1 becomes the anode electrode, so that plasma discharge is generated. In the same way, the whole discharge region is held at the anode potential, so that the plasma switch is turned on. The so-called AC plasma discharge is generated during one frame obtained by adding the first field and the second field.

Figure 7:
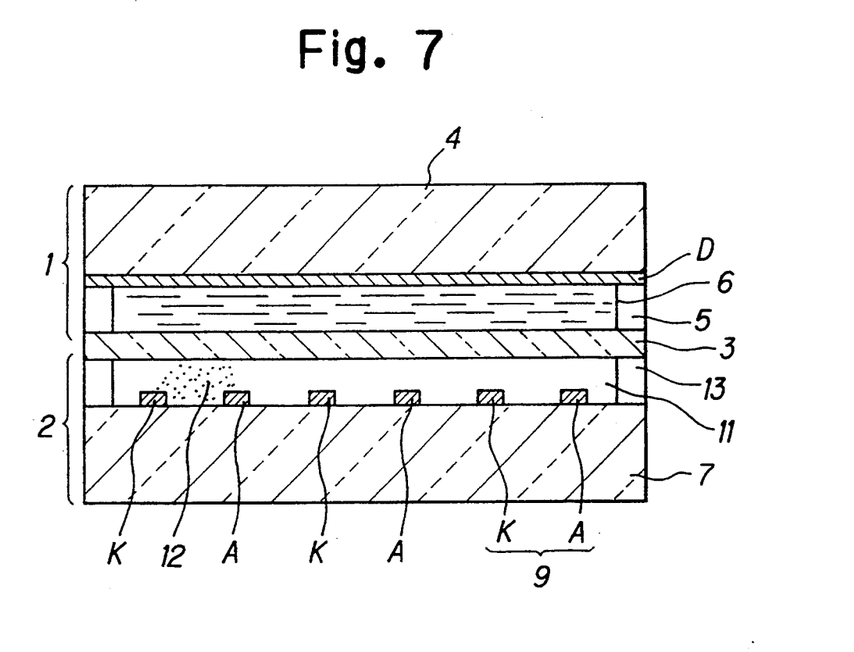
FIG. 7 is a cross-sectional view showing a second embodiment of the present invention.

FIG. 7 is a cross-sectional view showing a second embodiment of the plasma addressing electro-optical device according to the present invention. The same reference numerals have been retained for similar parts or elements which have the same functions as with the case of the first embodiment shown in FIG. 1. The feature of this second embodiment is to arrange a pair of the anode electrode A and the cathode electrode K alternately with predetermined regular intervals. The plasma electrodes 9 composed of the anode electrode A and the cathode electrode K can be obtained by patterning a chemically inactive metallic film in accordance with the photolithographic and etching technique. The inactive metallic material is a chemically stable noble metal such as gold, platinum, palladium, etc., because these noble metals are chemically stable and therefore inactive so that the plasma electrodes made of one of these metals are not corroded even within an impurity gas atmosphere. In other words, the life time of the plasma cell is long in spite of the fact that any hermetic sealing structure is not adopted. Further, it is possible to form the isolating barrier 3 and the substrate 7 of an organic material or a high molecular material. In addition, since these material can be bonded with a sealing material 13 made of high molecular material, it is possible to assemble the cell by low temperature treatment. Further, the baking process for outgassing can be treated at a low temperature.

In this second embodiment, being different from the first embodiment, the plasma chamber 11 is a single air tightly-closed chamber having spaces extending continuously over the whole surface of the substrate. In this embodiment, since the discharge region 12 formed between a pair of the anode electrode A and the cathode electrode K can be substantially localized, it is possible to obtain the line order scanning in the same way as with the case of the first embodiment shown in FIG. 1. In this embodiment, there exists a problem in that the resolution is deteriorated due to the diffusion of ion particles generated by discharge. However, this problem can be overcome by the following countermeasures. As is well known, the average free travel distance of the ion particles tends to decrease and therefore the ion particles tend to be localized, with increasing pressure of the gas enclosed within the plasma chamber 11. Therefore, it is possible to control the discharge plasma within an appropriate spacial range by setting the gas pressure high to some extent. On the other hand, there exists the case where the discharge starting voltage becomes high when the gas pressure is high; however, it is possible to control the gas pressure by reducing the interval between the two adjacent anode and cathode electrodes A and K with inverse proportion to the gas pressure, in accordance with Paschen's law. Although the optimum values of the gas pressure and the electrode interval are different according to the sort of gas, where a mixture gas of neon and argon is used and the electrode interval is 0.1 mm, the discharge can be generated at the atmospheric pressure (1 at).

Figure 8:
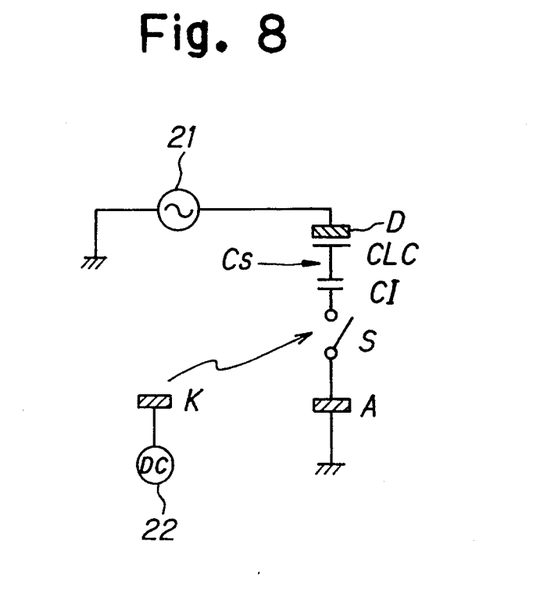
FIG. 8 is an equivalent circuit corresponding to each pixel included in the second embodiment shown in FIG. 7.

FIG. 8 is an equivalent circuit corresponding to a single pixel separated form the embodiment shown in FIG. 7. The same reference symbols have been retained for the similar elements which have the same functions as with the case of the first embodiment shown in FIG. 5. In this second embodiment, since the plasma electrodes are not covered with an insulating film, the DC discharge method is adopted. That is, the anode electrodes A are grounded, and a DC high tension pulse is applied to the cathode electrodes K from the scanning circuit 22.

Figure 9:
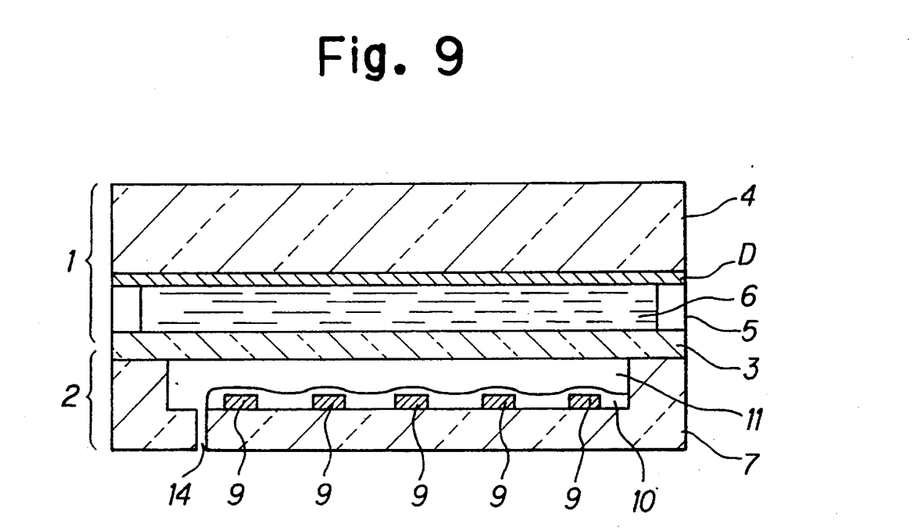
FIG. 9 is a cross-section view showing a third embodiment of the present invention.

FIG. 9 shows a third embodiment, in which the same reference numerals have been retained for the similar parts or elements which have the same functions as with the case of the first embodiment shown in FIG. 1. In this embodiment, the surface of the substrate 7 of the plasma cell 2 is cut flat to a predetermined depth by reaming processing for instance, and the isolating barrier 3 is bonded to the substrate 7 to form a plasma chamber 11. The plasma electrodes 9 are formed on the bottom surface of the substrate 7. The surfaces of the electrodes 9 are covered with an insulating film 10 for protection from impurities. Further, when the plasma electrodes 9 are formed by patterning a chemically inactive metallic film, it is possible to eliminate this insulating film 10. In both the cases, the plasma electrodes 9 are of a strong resistance against corrosion caused by impurities.

In this third embodiment, being different from the previous embodiments, the plasma chamber 11 is not air-tightly closed, but communicating with the outside through an aperture 14. Therefore, this plasma chamber 11 is filled with air as ionizable gas. When air is used under the atmospheric pressure, the efficiency of plasma gas generation is relatively low. In the case of the present invention, however, since the plasma discharge is not directly used for image display, but adopted only as plasma switching for addressing, the plasma generation efficiency or the light emitting efficiency is not important.

Further, in this embodiment, since the plasma chamber 11 communicates with the outside, the chamber 11 is free form mechanical stress caused by positive or negative pressure, thus realizing a plasma cell excellent in pressure resistance, as compared with the prior art plasma cell.

As described above, in the display device according to the present invention, since the corrosion resistance of the plasma cell can be improved markedly by covering the plasma electrodes with an insulating film or by forming the plasma electrodes by a chemically inactive metallic film, it is possible to simplify the plasma cell structure, as compared with the prior art cell structure, without depending upon any hermetic sealing structure. For instance, when a high molecular material is used for the cell, since the treatment temperature can be set relatively low during the assembly and the baking process, there exists such an advantage that it is possible to manufacture the plasma addressing electro-optical device of large size at a high productivity and a low cost. In addition, since the corrosion resistance of the plasma cell can be improved, the open-type plasma cell structure which communicates with the open air can be realized, thus eliminating the problem related to the pressure resistance.

What is claimed is:

1. A plasma addressing electro-optical device comprising:
   a first substrate having a plurality of signal electrodes arranged substantially in parallel to each other on a major surface thereof;
   a second substrate opposed to said first substrate;
   an electro-optical material layer positioned between inner surfaces of said first and second substrates; and
   a discharge chamber formed between the electro-optical material layer and said second substrate and containing an ionizable gas, the second substrate having a plurality of plasma electrodes on a major surface thereof, the plasma electrodes being overlaid with an insulating material to provide plasma addressing units, which form scanning lines so that the overlapping regions of signal electrodes and plasma addressing units define dimensions of elements and wherein the polarity of adjacent ones of said plasma electrodes are reversed field by field.

2. A plasma addressing electro-optical device as claimed in claim 1; wherein, said insulating material is a continuous layer for covering the plasma electrodes.

3. A plasma addressing electro-optical device as claimed in claim 1; wherein, said electro-optical material layer comprises a liquid crystal.

4. A plasma addressing electro-optical device as claimed in claim 1; wherein, the ionizable gas is excited by an AC energy source.

5. A plasma addressing electro-optical device comprising:
   a first substrate having a plurality of signal electrodes arranged substantially in parallel to each other on a major surface thereof;
   a second substrate opposed to said first substrate;
   an electro-optical material layer positioned between inner surfaces of said first and second substrates; and
   a discharge chamber formed between the electro-optical material layer and said second substrate and containing an ionizable gas, the second substrate having a plurality of plasma electrodes arranged substantially in parallel to each other, the plasma electrodes comprising an inactive metal to provide plasma addressing units which form scanning lines so that the overlapping regions of signal electrodes and plasma addressing units define dimensions of elements.

6. A plasma addressing electro-optical devices as claimed in claim 5, wherein, said electro-optical material layer comprises a liquid crystal.

* * * * *